United States Patent
O'Sullivan et al.

(10) Patent No.: US 10,409,576 B2
(45) Date of Patent: Sep. 10, 2019

(54) CHAINED DATA PROCESSING AND APPLICATION UTILIZATION

(75) Inventors: Joseph J. O'Sullivan, Mountain View, CA (US); Ricardo Marquez, Mountain View, CA (US); Michael J. Graves, Sunnyvale, CA (US)

(73) Assignee: INTUIT, INC., Mountain View, CA (US)

( * ) Notice: Subject to any disclaimer, the term of this patent is extended or adjusted under 35 U.S.C. 154(b) by 878 days.

(21) Appl. No.: 12/916,144

(22) Filed: Oct. 29, 2010

(65) Prior Publication Data

US 2012/0110565 A1    May 3, 2012

(51) Int. Cl.
| G06F 8/60 | (2018.01) |
| G06F 8/71 | (2018.01) |
| G06F 8/61 | (2018.01) |
| G06F 8/70 | (2018.01) |
| G06F 9/445 | (2018.01) |

(52) U.S. Cl.
CPC ............ *G06F 8/60* (2013.01); *G06F 8/61* (2013.01); *G06F 8/70* (2013.01); *G06F 8/71* (2013.01); *G06F 9/4451* (2013.01)

(58) Field of Classification Search
USPC .................................................. 717/168–178
See application file for complete search history.

(56) References Cited

U.S. PATENT DOCUMENTS

| 6,691,106 | B1 * | 2/2004 | Sathyanarayan | |
| 7,827,546 | B1 * | 11/2010 | Jones et al. | 717/173 |
| 8,615,772 | B2 * | 12/2013 | Maciocci | G06F 9/44526 |
| | | | | 719/313 |
| 2004/0034853 | A1 * | 2/2004 | Gibbons et al. | 717/174 |
| 2005/0005242 | A1 * | 1/2005 | Hoyle | 715/745 |
| 2006/0168574 | A1 * | 7/2006 | Giannini et al. | 717/168 |
| 2006/0200834 | A1 | 9/2006 | Cukierman et al. | |
| 2008/0004886 | A1 * | 1/2008 | Hames et al. | 705/1 |
| 2008/0168437 | A1 * | 7/2008 | Chen et al. | 717/176 |
| 2008/0168474 | A1 * | 7/2008 | Jeon et al. | 719/320 |
| 2010/0058302 | A1 * | 3/2010 | Broscaru et al. | 717/151 |

(Continued)

FOREIGN PATENT DOCUMENTS

| KR | 10-20030016746 A | 3/2003 |
| KR | 10-20090036856 A | 4/2009 |
| WO | 2005114432 A1 | 12/2005 |

OTHER PUBLICATIONS

First Examination Report for Indian Application No. 809/KOL/2011 dated Dec. 21, 2018.

(Continued)

*Primary Examiner* — Francisco J Aponte
*Assistant Examiner* — Mark A. Gooray
(74) *Attorney, Agent, or Firm* — Patterson + Sheridan, LLP (57) ABSTRACT

The disclosed embodiments provide a system that facilitates application usage. During operation, the system obtains a user context associated with a first user, wherein the user context includes at least one of a location of the first user, profile data for the first user, device data associated with a computing device for the first user, and data types associated with existing applications on the computing device. Next, the system obtains a first set of new applications matching the user context. Finally, the system provides the first set of new applications to the first user for installation and use by the first user.

27 Claims, 5 Drawing Sheets

(56) References Cited

U.S. PATENT DOCUMENTS

| | | | |
|---|---|---|---|
| 2010/0205274 A1 | 8/2010 | Gharabally | |
| 2010/0211636 A1* | 8/2010 | Starkenburg et al. | 709/203 |
| 2010/0306762 A1* | 12/2010 | Lindberg | G06F 8/61 |
| | | | 717/176 |
| 2010/0313182 A1* | 12/2010 | Chen et al. | 717/109 |
| 2011/0088026 A1* | 4/2011 | Swann | 717/173 |
| 2011/0202905 A1* | 8/2011 | Mahajan | 717/140 |
| 2011/0219008 A1* | 9/2011 | Been et al. | 707/742 |
| 2011/0258301 A1* | 10/2011 | McCormick | H04L 67/34 |
| | | | 709/222 |
| 2011/0307354 A1* | 12/2011 | Erman | G06F 8/60 |
| | | | 705/27.1 |

OTHER PUBLICATIONS

International Search Report and Written Opinion for Application No. PCT/US2011/037913 dated Feb. 9, 2012.

* cited by examiner

CHAINED DATA PROCESSING AND APPLICATION UTILIZATION

BACKGROUND

Related Art

The present embodiments relate to techniques for facilitating application usage. More specifically, the present embodiments relate to a method and system for chained data processing and application utilization.

Application software may be used to perform tasks of varying duration and complexity. Furthermore, applications typically use and/or generate specific types of data during execution. For example, a mapping application may process text-based searches related to geographic locations and provide graphical maps and/or list directions associated with the searches. Similarly, an online-shopping application may use purchase histories and/or personal preferences associated with users to filter product information that is displayed to the users.

Such application-specific data processing has a number of disadvantages. First, an application may be useful only if data used by the application is available. For example, a social-networking application may provide value to a user only if the user has a profile with the social-networking application. Second, application utilization typically requires manual discovery of available applications by users. For example, a user may install applications on his/her smartphone by browsing and/or searching the application marketplace for the smartphone. As a result, the user may not utilize applications outside of the browsing and/or search results. Third, data exchange between applications may not occur without the implementation and use of interfaces and/or libraries. For example, data structures used by a first application may be accessed by a second, unrelated application only if the first application provides an application programming interface (API).

Hence, what is needed is a mechanism for facilitating application utilization and data exchange among applications.

SUMMARY

The disclosed embodiments provide a system that facilitates application usage. During operation, the system obtains a user context associated with a first user, wherein the user context includes at least one of a location of the first user, profile data for the first user, device data associated with a computing device for the first user, and data types associated with existing applications on the computing device. Next, the system obtains a first set of new applications matching the user context. Finally, the system provides the first set of new applications to the first user for installation and use by the first user.

In some embodiments, the system also obtains an update to the user context. Next, the system obtains a second set of new applications matching the update. The system then provides the second set of new applications to the first user for installation and use by the first user.

In some embodiments, the system also facilitates use of the second set of new applications by enabling access to data generated by the first set of new applications from the second set of new applications.

In some embodiments, the data generated by the first set of new applications is stored in at least one of a centralized repository and the computing device.

In some embodiments, the update includes at least one of a new location of the first user, new profile data for the first user, and new data types associated with the first set of new applications.

In some embodiments, the system also provides one or more of the second set of new applications to a second user for installation and use by the second user.

In some embodiments, each of the first set of new applications is configured for use with the computing device or another computing device associated with the first user.

In some embodiments, the computing device is at least one of a mobile phone, a tablet computer, a personal computer, a laptop computer, a portable media player, a personal digital assistant (PDA), and a Global Positioning System (GPS) receiver.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a fieldprogrammable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Embodiments provide a method and system for facilitating application usage. Each application may correspond to application software such as a word processor, an email client, a web browser, a web application, and/or a mobile application. The application may be used to perform one or more tasks for a user of the application. For example, the application may allow the user to create documents, play audio or video, buy goods or services, communicate with contacts, and/or display webpages. In addition, the application may execute on a computing device such as a mobile phone, a tablet computer, a personal computer, a laptop computer, a portable media player, a personal digital assistant (PDA), and/or a Global Positioning System (GPS) receiver.

More specifically, embodiments provide a method and system for chained data processing and application utilization. A user context associated with the user may be obtained and matched with a set of applications. The user context may include a location of the user, profile data for the first user, device data associated with a computing device for the first user, and/or data types associated with existing applications on the computing device. The matched applications may then be provided to the user and/or other users for installation and use by the user(s).

Moreover, updates to the user context may be matched with additional sets of applications. For example, the user context may be updated after the user installs and runs a new application that generates data associated with the user's music preferences. A music-recommendation application that matches the updated user context may then be provided to the user to increase the value of both applications to the user. In other words, embodiments may enable dynamic, context-based adoption of applications by users, as well as data exchange among potentially unrelated applications.

Figure 1:
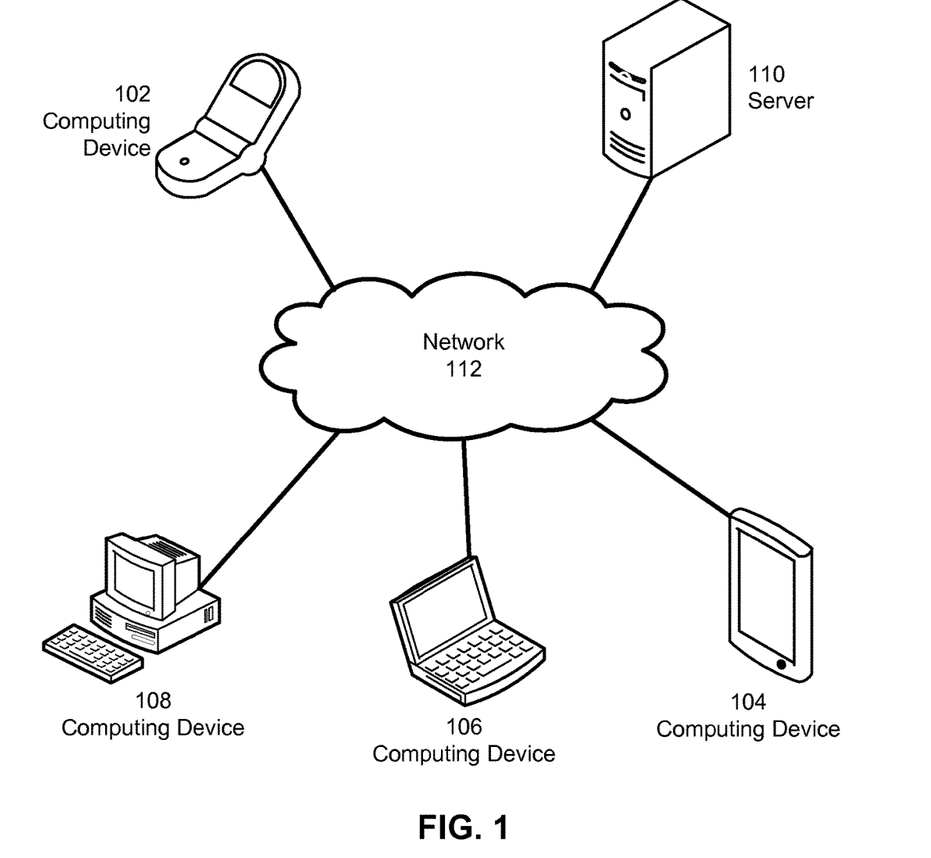
FIG. 1 shows a schematic of a system in accordance with an embodiment.

FIG. 1 shows a schematic of a system in accordance with an embodiment. As shown in FIG. 1, the system includes a number of computing devices 102-108 and a server 110. Computing devices 102-108 may be connected to each other and to server 110 through a network 112. As discussed below, the system of FIG. 1 may be used to facilitate application usage among users of computing devices 102-108.

Each computing device 102-108 may correspond to an electronic device that provides one or more services or functions to a user. For example, computing devices 102-108 may operate as mobile phones, tablet computers, personal computers, laptop computers, global positioning system (GPS) receivers, portable media players, and/or personal digital assistants (PDAs). In addition, each computing device 102-108 may include an operating system (not shown) that coordinates the use of hardware and software resources on the computing device, as well as one or more applications that perform specialized tasks for the user. For example, computing devices 102-108 may include applications such as an email client, address book, document editor, web browser, mapping application, calendar application, and/or media player. To perform tasks for the user, applications may obtain the use of hardware resources (e.g., processor, memory, I/O components, network interface card, graphics-processing unit (GPU), etc.) from the operating system, as well as interact with the user through a hardware and/or software framework provided by the operating system.

Network 112 may correspond to a local area network (LAN), wide area network (WAN), wireless network, mobile phone network, Bluetooth (Bluetooth™ is a registered trademark of Bluetooth Sig, Inc.) network, intranet, Internet, and/or other type of network that facilitates communication, connectivity, data transfer, and/or application use for users of computing devices 102-108. For example, users of computing devices 102-108 may connect to network 112 to send and receive emails, retrieve webpages, make phone calls, access web applications, download mobile applications, send and receive Short Message Service (SMS) messages, and/or transfer files.

In one or more embodiments, the system of FIG. 1 facilitates both data exchange among applications on computing devices 102-108 and utilization of the applications by users of computing devices 102-108. Each application may be implemented using a client-server architecture, in which part of the application is executed on one or more servers (e.g., server 110) and accessed from other machines (e.g., computing devices 102-108) using a locally installed executable and/or a web browser and network connection. In other words, the application may be implemented using a cloud computing system that is accessed over the Internet.

In particular, a user context associated with each user of a computing device (e.g., computing devices 102-108) may be obtained and matched with a set of new applications. The user context may include a location of the user, profile data for the first user, device data associated with a computing device for the first user, and/or data types associated with existing applications on the computing device.

The matched applications may then be provided to the user and/or other users for installation and use by the user(s). As discussed below with respect to FIG. 2, updates to the user context may be matched with additional sets of new applications that then are provided to the user(s) for installation and use by the user(s). For example, the user context may be updated with data types associated with newly installed applications. Applications that use the same data types may thus be suggested to the user(s) to increase the functionality and/or value of the applications to the user. Such context-based recommendation and chaining of applications may increase application adoption and use by reducing the users' reliance on manual discovery of applications (e.g., browsing, searching) and by facilitating data exchange among previously incompatible applications.

Figure 2:
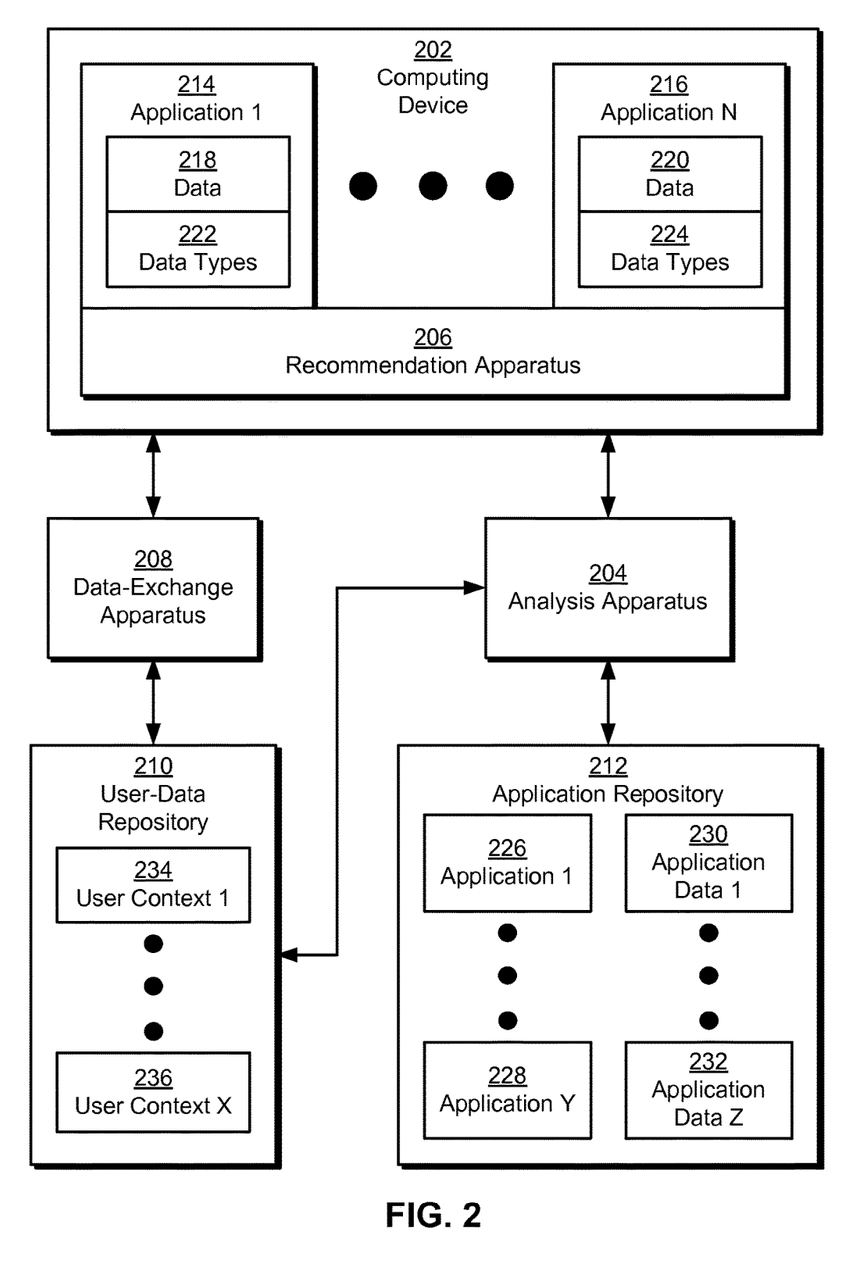
FIG. 2 shows a system for facilitating application usage in accordance with an embodiment.

FIG. 2 shows a system for facilitating application usage in accordance with an embodiment. The system of FIG. 2 includes an analysis apparatus 204, a recommendation apparatus 206, and a data-exchange apparatus 208. As mentioned above, the system of FIG. 2 may facilitate usage of applications (e.g., application 1 214, application n 216) on a computing device 202 such as a mobile phone, a tablet computer, a personal computer, a laptop computer, a portable media player, a PDA, and/or a GPS receiver.

First, analysis apparatus 204 may obtain a user context (e.g., user context 1 234, user context x 236) associated with a user of computing device 202. The user context may include a location of the user, profile data for the user, device data associated with computing device 202, and/or data types associated with existing applications on computing device 202. The user context may also be aggregated from multiple sources and stored in a user-data repository 210 for subsequent retrieval and use (e.g., by analysis apparatus 204).

For example, the user's location may be provided by the user and/or obtained from a GPS receiver on computing device 202, and the profile data may be obtained from user accounts (e.g., social-networking accounts, web application accounts, etc.) for the user. The device data may be obtained from computing device 202, and the data types (e.g., data types 222-224) may be obtained from applications (e.g., application 1 214, application n 216) on computing device 202 and/or from an application repository 212 containing application data (e.g., application data 1 230, application data z 232) for the applications. User contexts are discussed in further detail below with respect to FIG. 3.

Next, analysis apparatus 204 may match the user context with a first set of new applications from application repository 212. Application repository 212 may store applications (e.g., application 1 226, application y 228) that are configured for use with computing device 202 and/or other computing devices associated with the user. For example, application repository 212 may store applications that are compatible with the platform (e.g., operating system, hardware platform) of computing device 202, as well as other device platforms potentially used by the user and/or the user's contacts.

Alternatively, application repository 212 may store only application data (e.g., application data 1 230, application data z 232) associated with the applications. The application data may include data types created, exchanged, and/or used by the applications; descriptions of the applications; usage data such as usage statistics, user identities, user ratings, and/or user reviews associated with use of the applications; cross-compatibility data regarding each application's ability to use data generated by other applications; and/or links to locations (e.g., Uniform Resource Locators (URLs), Internet Protocol (IP) addresses) from which the applications may be accessed and/or downloaded.

To match the new applications to the user context, analysis apparatus 204 may compare the user context with application data for the applications. Applications that fit the user's profile and preferences, location, computing devices (e.g., computing device 202), and/or existing applications may then be recommended to the user. For example, the user context may indicate that the user has entered a clothing store. As a result, an application that recommends articles of clothing from the store based on the user's clothing preferences and/or that allows the user to manage his/her budget while shopping may match the user context.

Those skilled in the art will appreciate that the functionality of analysis apparatus 204 may be implemented in a variety of ways. For example, analysis apparatus 204 may match new applications to user contexts using a set of rules, machine-learning techniques, and/or data-mining techniques. Moreover, the operation of analysis apparatus 204 may be configurable. For example, the user may specify and/or prioritize the criteria (e.g., location, user preferences, application usage data) used by analysis apparatus 204 to match applications with the user context.

Recommendation apparatus 206 may then provide the new applications to the user for installation and use by the user. For example, recommendation apparatus 206 may obtain application data for the new applications from analysis apparatus 204 and display the application data to the user within a user interface for computing device 202. The user may then install and use the new applications by selecting links to the new applications from the user interface.

Moreover, some of the new applications may be configured for use with another computing device associated with the user. For example, the user may own a mobile phone and a personal computer (PC). Data (e.g., data 218-220) generated by applications on each device may be useful to applications configured for use with the other device. As a result, analysis apparatus 204 and recommendation apparatus 206 may increase the functionality of both devices by suggesting both mobile applications and PC applications to the user through the user interfaces of one or both devices.

As described above, updates to the user context may be matched with additional sets of new applications. Such updates may be stored in user-data repository 210, with user context 1 234 corresponding to the first user context and user context x 236 corresponding to the most recent update to the user context. Moreover, each update to the user context may include a new location of the first user, new profile data for the first user, and/or new data types associated with the first set of new applications. For example, the user context may be updated as the user changes location, installs or removes applications, changes computing devices, and/or changes his/her profile data (e.g., user preferences).

Analysis apparatus 204 may respond to such updates by matching the updates to additional sets of new applications. As discussed above, analysis apparatus 204 may obtain the first user context (e.g., user context 1 234) for the user from user-data repository 210 and match the user context with a first set of new applications. After the user context is updated (e.g., in user-data repository 210), analysis apparatus 204 may match the update with a second set of new applications. Analysis apparatus 204 may thus continue matching updates to the user context with sets of new applications as long as updates to the user context are detected in user-data repository 210. In turn, recommendation apparatus 206 may increase application adoption and functionality by providing each set of new applications to the user for installation and use by the user.

As discussed above, applications matching the user context may be provided to the user for use with computing device 202 and/or other computing devices associated with the user. Moreover, one or more applications that match the user context may be provided to other users for installation and use by the other users. For example, a social-networking application recently installed by the user may be suggested to the user's contacts from the user's address book to facilitate interaction between the user and his/her contacts.

Finally, data-exchange apparatus 208 may facilitate the operation of the applications by enabling access to data (e.g., data 218-220) generated by a first set of new applications from a second set of new applications. Such data access may be required if an application in the second set uses and/or processes data generated by an application in the first set. To simplify data exchange among the applications, data generated by the applications may be stored in a centralized repository such as user-data repository 210. As a result, data-exchange apparatus 208 may provide an interface that allows the applications to access the data from the centralized repository based on access permissions associated with each application. On the other hand, the data may be stored on computing device 202. Data-exchange apparatus 208 may thus manage file system access and/or data sharing among the applications directly from a hardware and/or software module on computing device 202.

Analysis apparatus 204 and/or recommendation apparatus 206 may also update application data for applications in application repository 212 based on the user's application usage, reviews, ratings, and/or preferences. For example, the user may install one application each from three consecutive sets of new applications suggested by recommendation apparatus 206. The first application may generate data that is used by the second application, while both the first and second applications may generate data that is used by the third application. After each application is installed, application data for the application may be periodically updated with usage statistics (e.g., frequency, locations, times) for the application, as well as ratings or reviews associated with the application from the user. In addition, application data for the second application may be updated with cross-compatibility data regarding the operation of the second application using data generated by the first application, and application data for the third application may be updated with cross-compatibility data related to the ability of the third application to correctly use data generated by the first and second applications.

Consequently, the matching of applications to user contexts may change over time as data associated with the use of the applications is collected. For example, analysis apparatus 204 may stop matching a new application with a user context containing an existing application if the new application is unable to process data generated by the existing application and/or if users are dissatisfied with the new application. Conversely, analysis apparatus 204 and recommendation apparatus 206 may suggest "composite" applications created from sets of applications that successfully process and exchange data in a pipeline, even if the applications are obtained from and/or developed by different sources.

Figure 3:
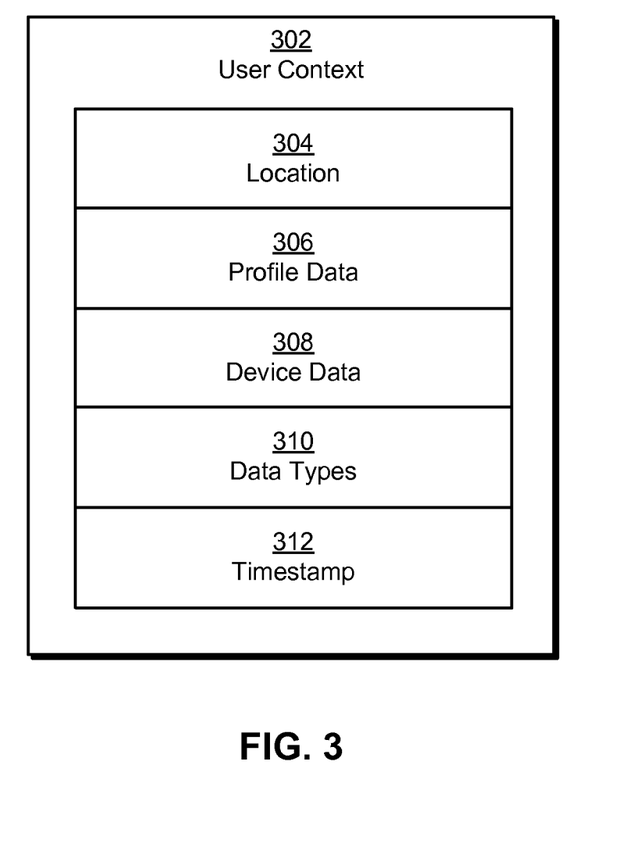
FIG. 3 shows a user context in accordance with an embodiment.

FIG. 3 shows a user context 302 in accordance with an embodiment. As described above, user context 302 may increase application utilization and functionality by enabling the recommendation of potentially useful applications to a user, as well as facilitating data exchange among the applications. User context 302 includes a location 304, profile data 306, device data 308, data types 310, and a timestamp 312.

Location 304 may correspond to the user's geographic location. For example, location 304 may contain a set of coordinates, a street address, an intersection, a neighborhood, a city, and/or the name of an entity (e.g., contact, business, organization) with a physical address. Location 304 may be provided by the user and/or obtained from a computing device used by the user. For example, location 304 may be obtained as a set of coordinates from a GPS receiver in the user's mobile phone.

Profile data 306 may include the user's contacts, calendar, user profiles on websites and/or applications, preferences, browser history, and/or other data that can be used to characterize the user. Profile data 306 may be obtained from user accounts for the user and/or applications used by the user or the user's contacts. For example, profile data 306 may be aggregated from a social-networking application, an address book application, email accounts, a calendar application, online shopping websites, and/or computing devices used by the user.

On the other hand, device data 308 may describe the computing device(s) used by the user. For example, device data 308 may identify the model and/or operating system of each computing device, as well as the applications installed on the computing device. Device data 308 may also include usage statistics for the applications and/or configuration information for the computing device. Device data 308 may facilitate device-based matching of applications with user context 302. For example, device data 308 may allow new applications to be matched with computing devices used by the user and/or other users associated with user context 302.

Data types 310 may describe the data generated and/or used by applications on the computing device(s). For example, data types 310 may include Extensible Markup Language (XML) tags, database fields, file formats, and/or metadata about other types of formatted data. Data types 310 may additionally include descriptions of the data, such as the type of information represented by a particular field or XML tag and/or the locations of specific pieces of data within a document. As a result, data types 310 may allow applications to exchange data with one another. For example, data types 310 may allow data generated by one set of applications to be used by another, potentially unrelated set of applications, which in turn may enable the creation of "composite" applications from groups of applications that process and exchange data in a chained fashion.

Timestamp 312 may represent the time at which user context 302 is obtained and/or updated. If different parts of user context 302 are obtained at different times and/or intervals, a separate timestamp may be obtained for each part. For example, profile data 306 may be updated daily, device data 308 may be updated as the user logs into or out of various computing devices, data types 310 may be updated whenever the user adds or removes applications from the computing devices, and location 304 may be updated as GPS-enabled devices used by the user detect changes in the user's coordinates. Timestamp 312 may thus allow updates to user context 302 to be tracked and/or analyzed for patterns that further facilitate the matching of applications to user context 302.

Figure 4:
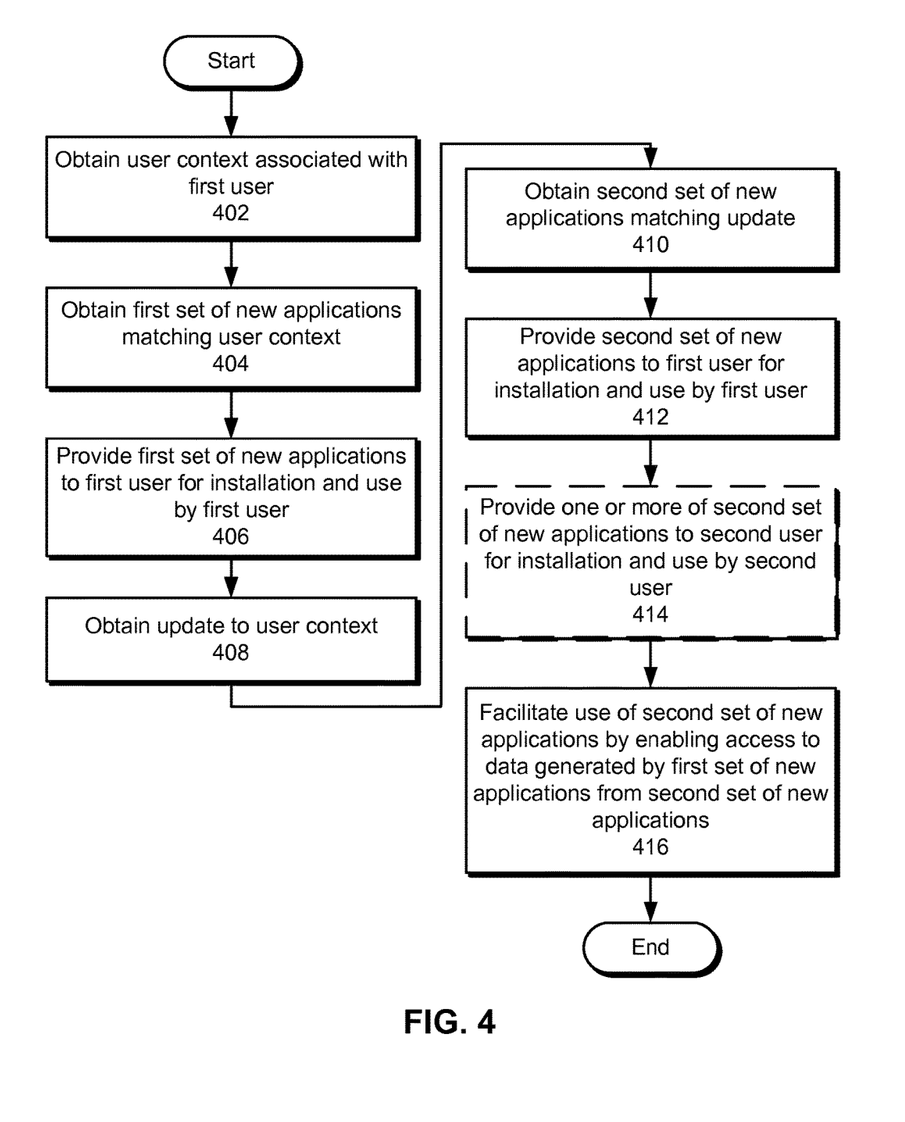
FIG. 4 shows a flowchart illustrating the process of facilitating application usage in accordance with an embodiment.

FIG. 4 shows a flowchart illustrating the process of facilitating application usage in accordance with an embodiment. In one or more embodiments, one or more of the steps may be omitted, repeated, and/or performed in a different order. Accordingly, the specific arrangement of steps shown in FIG. 4 should not be construed as limiting the scope of the embodiments.

First, a user context is obtained for a first user (operation 402). The user context may include a location of the first user, profile data for the first user, device data associated with a computing device for the first user, and/or data types associated with existing applications on the computing device. Next, a first set of new applications matching the user context is obtained (operation 404). The new applications may be matched with the user context by comparing application data (e.g., application descriptions, usage data, data types, cross-compatibility data) for each application with the user context and selecting applications that fit the user context.

The first set of new applications may then be provided to the first user for installation and use by the first user (operation 406). For example, links to the new applications may be displayed within a user interface for the computing device. The user may then download and install an application by selecting the corresponding link within the user interface. Similarly, applications configured for use with another computing device of the user may be displayed within the user interface for the other computing device.

An update to the user context may also be obtained (operation 408). For example, the user context may be updated with a new location of the first user, new profile data for the first user (e.g., feedback regarding newly installed applications), and/or new data types associated with the first set of new applications (e.g., applications installed by the user from the first set of new applications). In turn, a second set of new applications matching the update is obtained (operation 410) and provided to the first user for installation and use by the first user (operation 412).

Moreover, one or more of the second set of applications may be provided to a second user for installation and use by the second user (operation 414). For example, the first user may purchase goods and services from a retail website through an application for the retail website. Profile data associated with the user's purchases may be used by a gift-recommendation application that is suggested to the second user to facilitate gift buying for the first user by the second user.

Finally, use of the second set of new applications is facilitated by enabling access to data generated by the first set of new applications from the second set of new applications (operation 416). The data may be stored in a centralized repository and/or in the computing device. As a result, access to the data by the second set of applications may be mediated by a mechanism with access to the centralized repository and/or on the computing device.

Furthermore, operations 408-416 may be repeated as the user context is updated over time. Each update may be obtained (operation 408) and matched with a set of new applications (operation 410). The new applications may then be provided to the first user and/or other users for installation and use by the user(s) (operations 412-414), and data exchange among the applications may be enabled (operation 416). The continued generation and use of data by the applications may allow potentially unrelated applications to execute and exchange data in a pipeline. Such chained data processing and exchange may improve the operation of the applications by allowing the applications to access larger amounts of data and/or cooperate with other applications in performing tasks for the user. At the same time, context-based matching of applications to the user may allow the user to discover applications that are potentially useful in the user's immediate environment and/or that build on the functionality of the user's existing applications.

Figure 5:
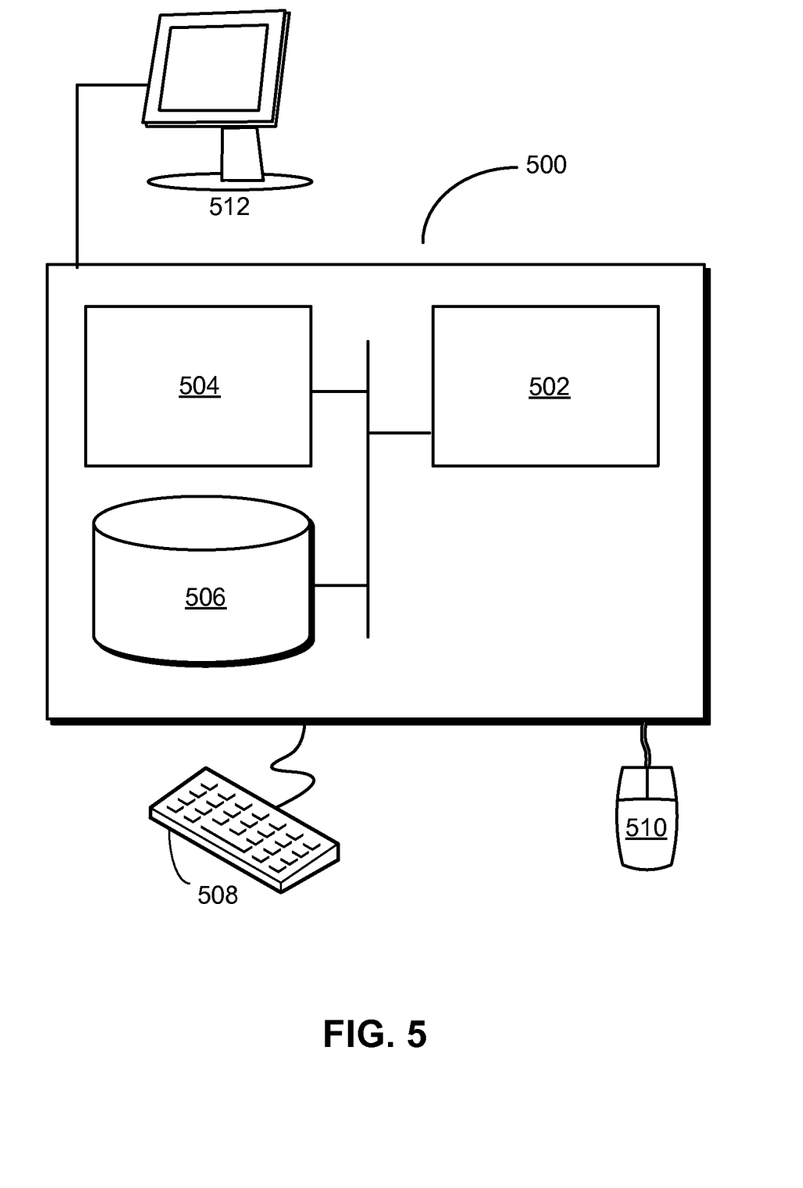
FIG. 5 shows a computer system in accordance with an embodiment.

FIG. 5 shows a computer system 500 in accordance with an embodiment. Computer system 500 may correspond to an apparatus that includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the present embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In one or more embodiments, computer system 500 provides a system for facilitating application usage. The system may include an analysis apparatus that obtains a user context associated with a first user and matches the user context with a first set of new applications. The user context may include a location of the first user, profile data for the first user, device data associated with a computing device for the first user, and/or data types associated with existing applications on the computing device. The system may also include a recommendation apparatus that provides the first set of new applications to the first user for installation and use by the first user.

The analysis apparatus may also obtain an update to the user context, and obtain a second set of new applications matching the update. The recommendation apparatus may then provide the second set of new applications to the first user and/or a second user for installation and use by the first and/or second user. Finally, the system may include a data-exchange apparatus that facilitates use of the second set of new applications by enabling access to data generated by the first set of new applications from the second set of new applications.

In addition, one or more components of computer system 500 may be remotely located and connected to the other components over a network. Portions of the present embodiments (e.g., analysis apparatus, recommendation apparatus, data-exchange apparatus, etc.) may also be located on different nodes of a distributed system that implements the embodiments. For example, the present embodiments may be implemented using a cloud computing system that enables chained data processing and application execution for users of one or more computing devices.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for facilitating application usage on a computing device, comprising:
   obtaining a first user context associated with a first user of a first computing device, wherein the first user context includes:
      a timestamp associated with the first user context;
      profile data of the first user, wherein the profile data includes at least one or more of the user's contacts, calendar, a profile on a website or an application on the first computing device, preferences, and browser history;
      device data associated with the first computing device; and
      data types associated with existing applications on the first computing device;
   obtaining a second user context associated with a second user of a second computing device, wherein the second user is listed in the profile data of the first user;
   determining a first new application matching the first user context by comparing application data for the first new application with the first user context, wherein the matching is based on:
      the user preferences in the profile data of the first user context,
      device-based matching based on the device data of the first computing device, and
      the data types associated with the existing applications on the first computing device;
   providing a link of the first new application to the first user for installation on the first computing device;
   obtaining an update of the first user context based on the first user installing and executing the first new application on the first computing device, wherein the update to the first user context includes new profile data for the first user and new data types associated with the first new application;
   determining a second new application matching the update of the first user context and the second user context by comparing application data for the second new application with the update of the first user context and the second user context; and providing the second new application for installation and execution on the second computing device, wherein the second new application is allowed to access data generated by the first new application to allow the second new application to cooperate with the first new application to perform tasks in the second new application for the second user based at least on the first user's new profile data in the update of the first user context.

2. The method of claim 1, further comprising: facilitating use of the second new application by enabling access to data generated by the first new application.

3. The method of claim 2, wherein the data generated by the first new application is stored in a centralized repository.

4. The method of claim 1, further comprising: updating application data for each installed new application based on application usage statistics.

5. The method of claim 1, further comprising:
determining if the second new application is able to process data generated by the first new application; and
in response to determining the second new application is not able to process data generated by the first new application, the matching with the second new application is stopped.

6. The method of claim 1, further comprising: creating composite applications based on sets of applications that process and exchange data in a pipeline.

7. The method of claim 1, wherein providing the second new application for installation on the second computing device comprises:
displaying in a user interface of the second computing device a link corresponding to the second new application for installation on the second computing device; and
receiving a selection of the link for installation of the second new application on the second computing device.

8. The method of claim 1, wherein the first user context includes a location of the first user.

9. The method of claim 1, further comprising analyzing timestamps of the first user context and the update of the first user context to identify a pattern for determining the second new application.

10. A system, comprising:
a processor; and
a memory storing instructions which when executed by the processor perform an operation for facilitating application usage on a computing device, the operation comprising:
obtaining a first user context associated with a first user of a first computing device, wherein the first user context includes:
a timestamp associated with the first user context;
profile data of the first user, wherein the profile data includes at least one or more of the user's contacts, calendar, a profile on a website or an application on the first computing device, preferences, and browser history;
device data associated with the first computing device; and
data types associated with existing applications on the first computing device;
obtaining a second user context associated with a second user of a second computing device, wherein the second user is listed in the profile data of the first user;
determining a first new application matching the first user context by comparing application data for the first new application with the first user context, wherein the matching is based on:
the user preferences in the profile data of the first user context,
device-based matching based on the device data of the first computing device, and
the data types associated with the existing applications on the first computing device;
providing a link of the first new application to the first user for installation on the first computing device;
obtaining an update of the first user context based on the first user installing and executing the first new application on the first computing device, wherein the update to the first user context includes new profile data for the first user and new data types associated with the first new application;
determining a second new application matching the update of the first user context and the second user context by comparing application data for the second new application with the update of the first user context and the second user context; and
providing the second new application for installation and execution on the second computing device, wherein the second new application is allowed to access data generated by the first new application to allow the second new application to cooperate with the first new application to perform tasks in the second new application for the second user based at least on the first user's new profile data in the update of the first user context.

11. The system of claim 10, the operation further comprises: facilitating use of the second new application by enabling access to data generated by the first new application.

12. The system of claim 11, wherein the data generated by the first new application is stored in a centralized repository.

13. The system of claim 10, further comprising: creating composite applications based on sets of applications that process and exchange data in a pipeline.

14. The system of claim 10, wherein providing the second new application for installation on the second computing device comprises:
displaying in a user interface of the second computing device a link corresponding to the second new application for installation on the second computing device; and
receiving a selection of the link for installation of the second new application on the second computing device.

15. The system of claim 10, further comprising: updating application data for each installed new application based on application usage statistics.

16. The system of claim 10, further comprising:
determining if the second new application is able to process data generated by the first new application; and
in response to determining the second new application is not able to process data generated by the first new application, the matching with the second new application is stopped.

17. The system of claim 10, wherein the first user context includes a location of the first user.

18. The system of claim 10, further comprising analyzing timestamps of the first user context and the update of the first user context to identify a pattern for determining the second new application.

19. A non-transitory computer-readable storage medium storing instructions that when executed by a computer cause the computer to perform a method for facilitating application usage on a computing device, the method comprising:
- obtaining a first user context associated with a first user of a first computing device, wherein the first user context includes:
  - a timestamp associated with the first user context;
  - profile data of the first user, wherein the profile data includes at least one or more of the user's contacts, calendar, a profile on a website or an application on the first computing device, preferences, and browser history;
  - device data associated with the first computing device; and
  - data types associated with existing applications on the first computing device;
- obtaining a second user context associated with a second user of a second computing device, wherein the second user is listed in the profile data of the first user;
- determining a first new application matching the first user context by comparing application data for the first new application with the first user context, wherein the matching is based on:
  - the user preferences in the profile data of the first user context,
  - device-based matching based on the device data of the first computing device, and
  - the data types associated with the existing applications on the first computing device;
- providing a link of the first new application to the first user for installation on the first computing device;
- obtaining an update of the first user context based on the first user installing and executing the first new application on the first computing device, wherein the update to the first user context includes new profile data for the first user and new data types associated with the first new application;
- determining a second new application matching the update of the first user context and the second user context by comparing application data for the second new application with the update of the first user context and the second user context; and
- providing the second new application for installation and execution on the second computing device, wherein the second new application is allowed to access data generated by the first new application to allow the second new application to cooperate with the first new application to perform tasks in the second new application for the second user based at least on the first user's new profile data in the update of the first user context.

20. The non-transitory computer-readable storage medium of claim 19, further comprising: facilitating use of the second new application by enabling access to data generated by the first new application.

21. The non-transitory computer-readable storage medium of claim 20, wherein the data generated by the first new application is stored in a centralized repository.

22. The non-transitory computer-readable storage medium of claim 19, further comprising creating composite applications based on sets of applications that process and exchange data in a pipeline.

23. The non-transitory computer-readable storage medium of claim 19, wherein providing the second new application for installation on the second computing device comprises:
- displaying in a user interface of the second computing device a link corresponding to the second new application for installation on the second computing device; and
- receiving a selection of the link for installation of the second new application on the second computing device.

24. The non-transitory computer-readable storage medium of claim 19, further comprising: updating application data for each installed new application based on application usage statistics.

25. The non-transitory computer-readable storage medium of claim 19, further comprising:
- determining if the second new application is able to process data generated by the first new application; and
- in response to determining the second new application is not able to process data generated by the first new application, the matching with the second new application is stopped.

26. The non-transitory computer-readable storage medium of claim 19, wherein the first user context includes a location of the first user.

27. The non-transitory computer-readable storage medium of claim 19, further comprising analyzing timestamps of the first user context and the update of the first user context to identify a pattern for determining the second new application.

* * * * *